United States Patent [19]

Jeong

[11] Patent Number: 5,117,286

[45] Date of Patent: May 26, 1992

[54] VIDEO SIGNAL AND OUTPUT DEVICE FOR FREEZE-FRAME VIDEO TELEPHONE

[75] Inventor: Ju H. Jeong, Daejeon, D.P.R. of Korea

[73] Assignee: Korea Telecommunications Authority Electronics & Telecommunications Research Institute, Seoul, D.P.R. of Korea

[21] Appl. No.: 578,879

[22] Filed: Sep. 7, 1990

[30] Foreign Application Priority Data

Sep. 9, 1989 [KP] D.P.R. of Korea ........... 1989-130 82

[51] Int. Cl.[5] .............................................. H04N 7/12
[52] U.S. Cl. ........................................ 358/85; 379/53
[58] Field of Search ................. 358/85, 105, 181, 134, 358/153; 379/53, 54

[56] References Cited

U.S. PATENT DOCUMENTS

4,932,047  6/1990  Emmons et al. ................... 358/85 X
4,979,028  12/1990  Minematsu et al. .................. 358/85
4,980,761  12/1990  Natori ..................................... 358/85

Primary Examiner—Victor R. Kostak
Attorney, Agent, or Firm—Blakely Sokoloff Taylor & Zafman

[57] ABSTRACT

A video input and output device which generates sampling frequency synchronized to the video signal, and stores video image of 256 grey levels, 8 bits wide, per pixel in memory after realtime sampling and quanitization following the selection of the necessary part of the input video signal. The invention also adopts a two-dimensional addressing technique for the simplification of the hardware structure, and can easily redefine the size of the video image for following future trends.

3 Claims, 6 Drawing Sheets

VIDEO SIGNAL AND OUTPUT DEVICE FOR FREEZE-FRAME VIDEO TELEPHONE

BACKGROUND OF THE INVENTION

The present invention relates to a video input and output device which inputs video data for transmission from camera and outputs video data to a monitor in a freeze-frame video phone over a standard telephone line which transmits and receives freeze-frame video data, in appropriate intervals, between the users.

In the Nippon TTC standard for freeze-frame video phone, the grey levels for a pixel is 16, 32 or 64. However, it is insufficient for good video image quality. Also, in the freeze-frame video phone available on market, the video image quality can be easily disturbed when the object slightly moves because several frames are used just for one video image.

SUMMARY OF THE INVENTION

The present invention provides a video input and output device with improved performance which generates sampling frequency synchronized to the video signal, and stores video image data of 256 grey levels, 8-bits wide, per pixel in memory after real-time sampling and quantization following the selection of the necessary part out of the input video signal for solving the problems described above. The present invention also provides a video input and output device which adopts a two-dimensional addressing technique for the simplification of the hardware structure, and can easily define the size of video image data for following the future trends.

To achieve the object mentioned above, the present invention comprises a system bus, a host connection means, connected to the system bus, checking the control and the operation status of the video input and output equipment by the CPU, a mode control signal generation means, connected to the host connection means, which receives the control signal from the host connection means, and generates a bypass mode signal, a display mode signal, an acquisition mode signal, and a video image data size signal for controlling each operation, a synchronization signal separation circuit which separates the input composite video signal into a vertical synchronization signal, a horizontal synchronization signal, a composite synchronization signal, an odd/even field signal, and a burst signal, a PLL (Phase-Locked Loop) circuit which generates a signal with frequency, 384 times the horizontal synchronization signal, after reception of the horizontal synchronization signal from the synchronization signal separation circuit, a window signal generation means, connected to the PLL circuit, which selects a part of the relevant video image data out of the input video signal, address buffer means, connected to the bus and the window generation means and the mode control signal generation means, which generates address for the access of a video image data storage memory, a first analog interface means for reception of the input video signal, an A/D (Analog to Digital) converter, connected to the first analog interface means, which converts analog signal into digital signal, a data buffer means, connected to the bus and the A/D converter and the mode control signal generator, which transmits and receives data with the video image data storage memory, a multiplexer connected to the data buffer means, the A/D converter, and the mode control signal generator, a D/A (Digital to Analog) converter which converts the digital signal from the multiplexer into analog signal, and a second analog interface means connected to the D/A converter.

DETAILED DESCRIPTION OF THE PREFERRED EMBODIMENT

Figure 1:
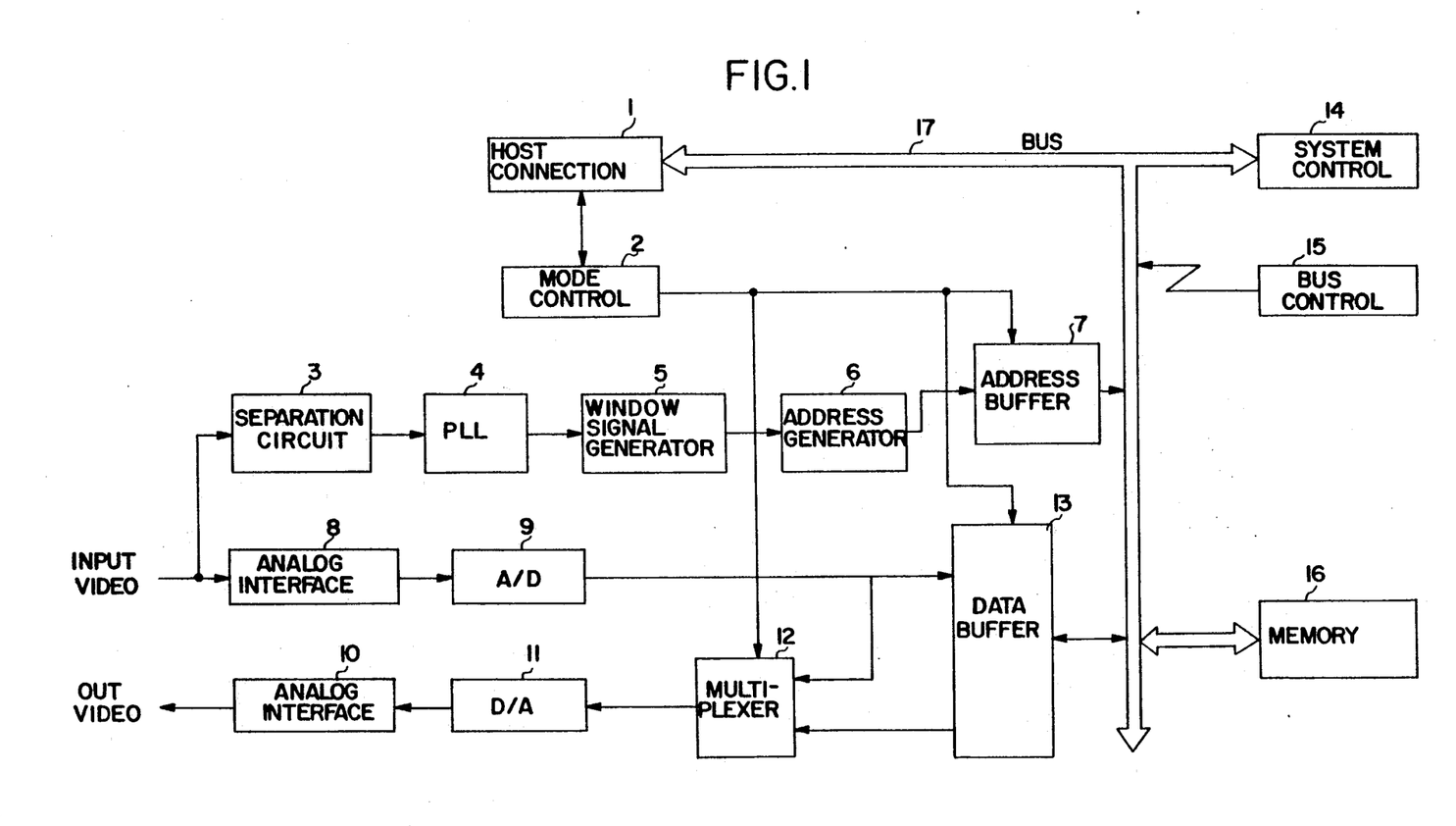
FIG. 1 is a block diagram of the present invention.
Figure 2:
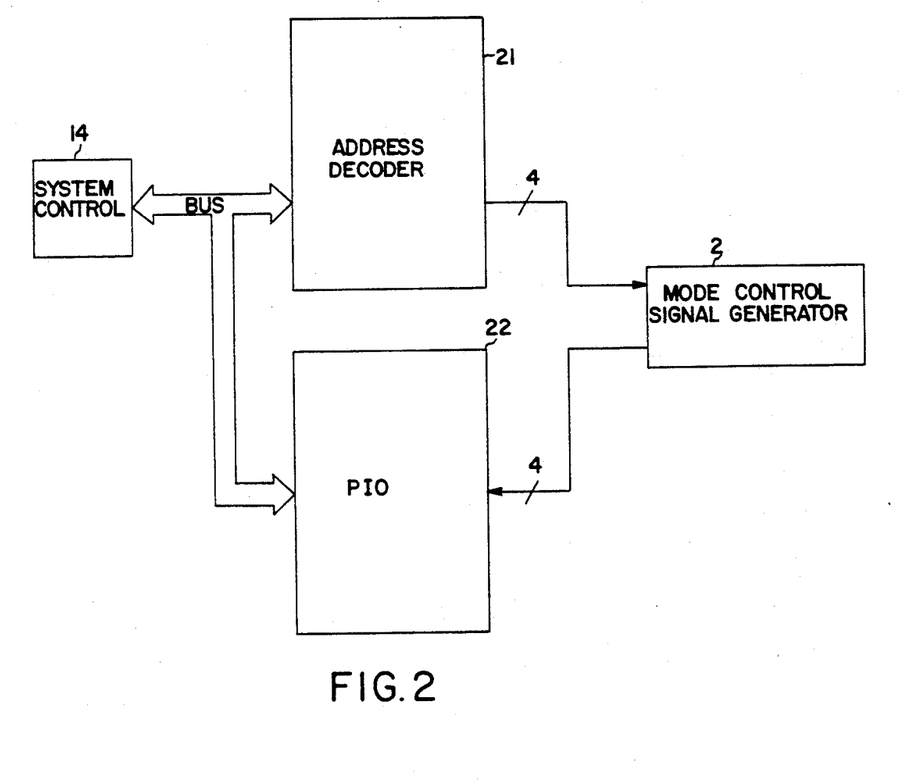
FIG. 2 is a block diagram of a host connection part.
Figure 3:
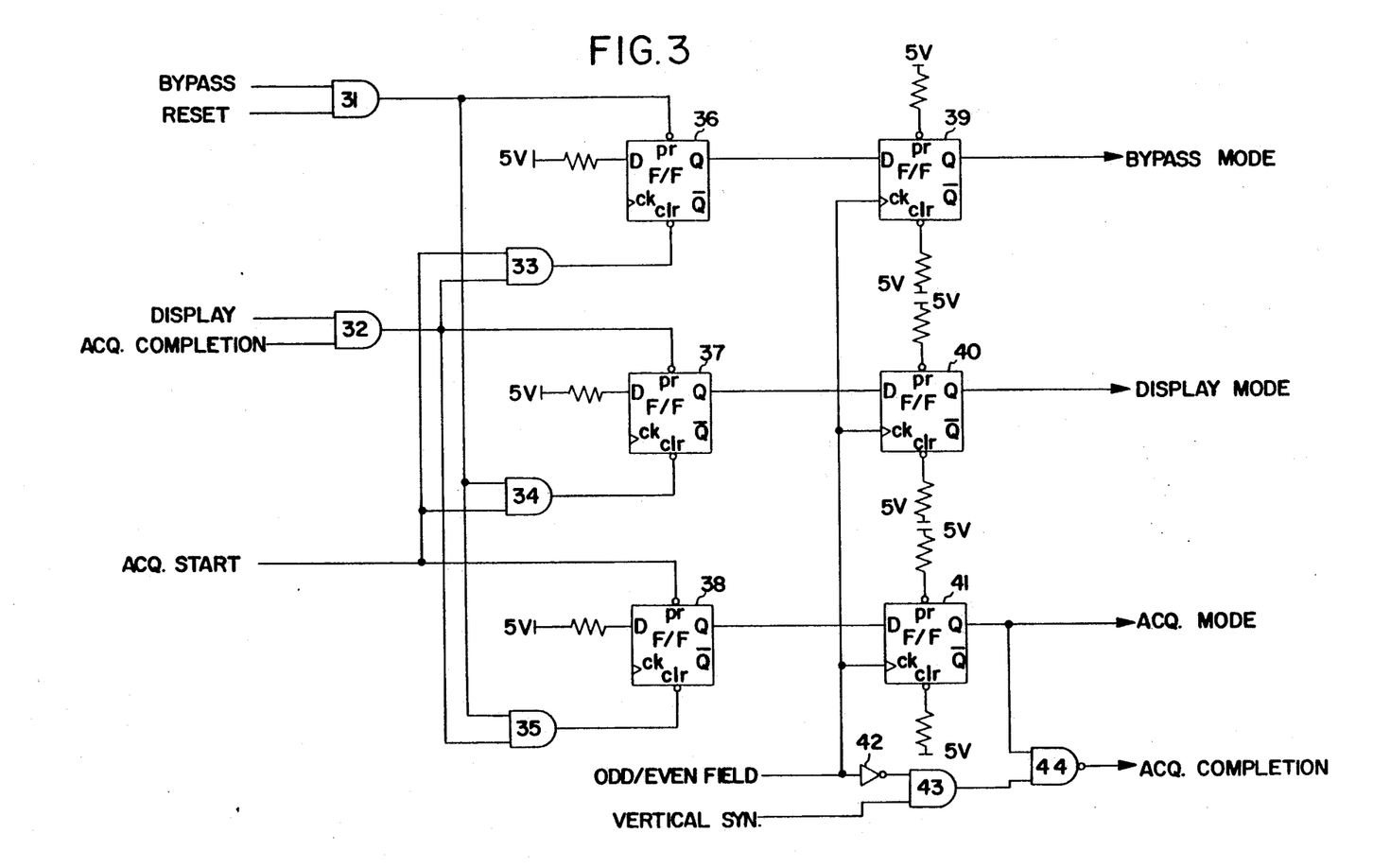
FIG. 3 is a block diagram of a mode control signal generator.
Figure 4:
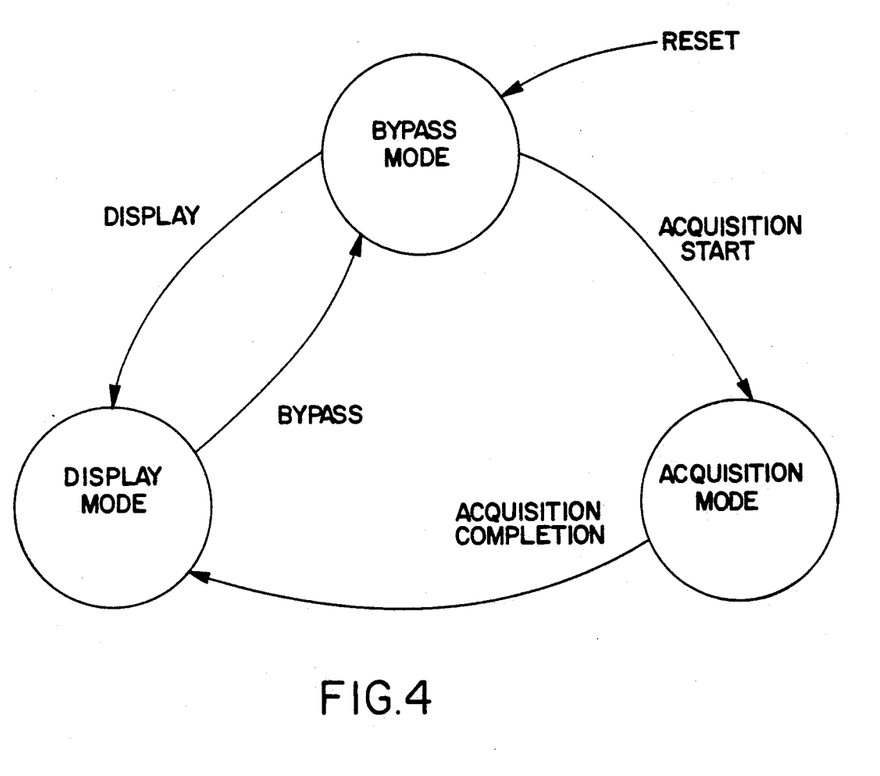
FIG. 4 is a state transient diagram for the mode control signal.
Figure 5A:
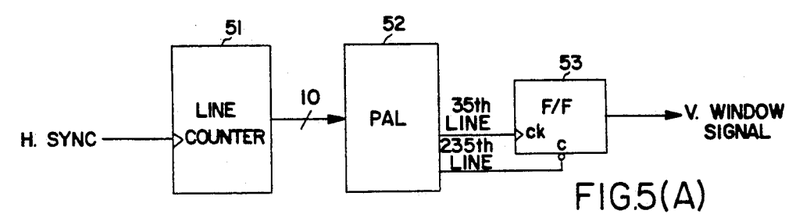
FIGS. 5A-5D are block diagrams and timing diagrams for a window generator.
Figure 5B:
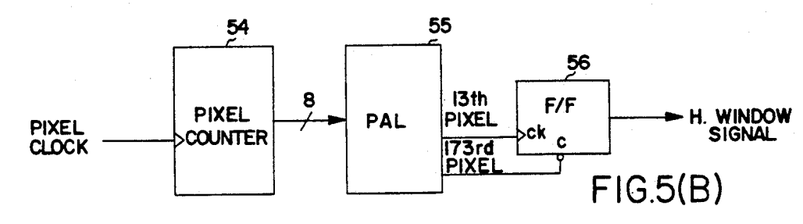
Figure 5C:
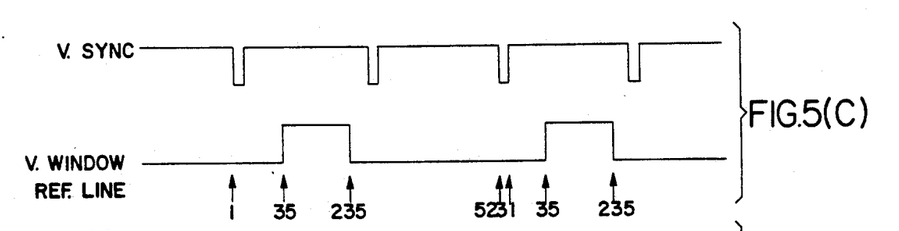
Figure 5D:
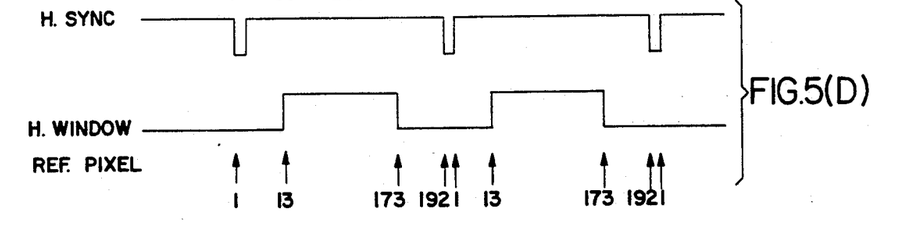
Figure 6:
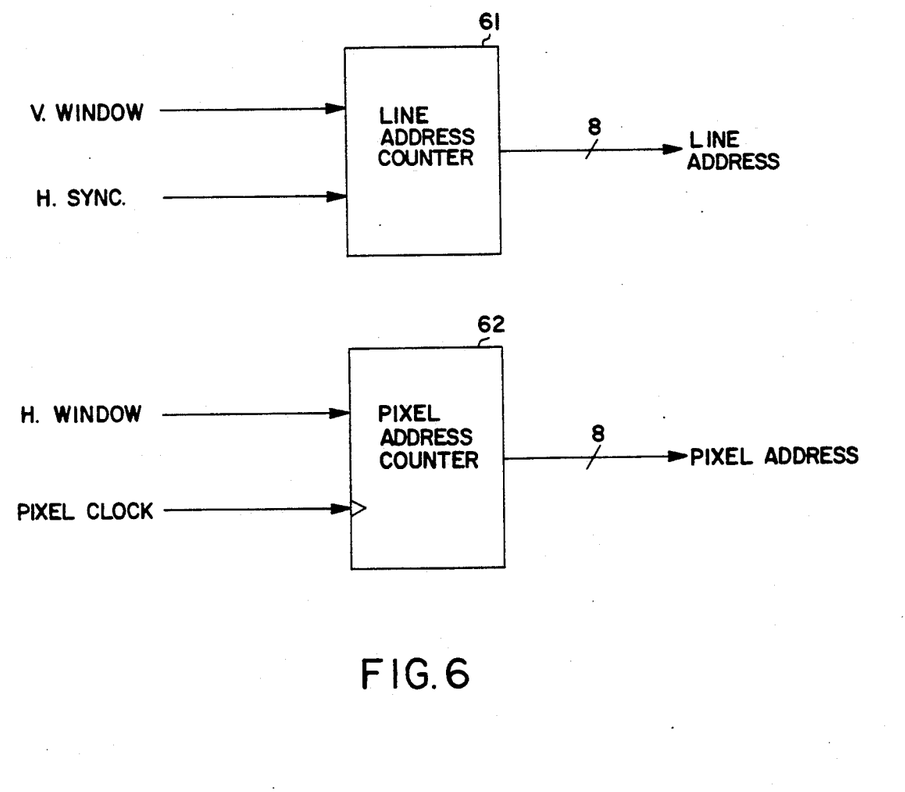
FIG. 6 is a block diagram of an address generator.

FIG. 1 is a block diagram of the present invention. FIG. 2 is a block diagram of a host connection part. FIG. 3 is a block diagram of a mode control signal generator. FIG. 4 is a state transient diagram for the mode control signal. FIG. 5 is a block diagram and a timing diagram for a window generator. FIG. 6 is a block diagram of an address generator. In FIG. 1 and FIG. 2, the host connection part 1 consists of a address decoder 21, connected to the system control part 14 through the system bus 17, and also connected to the mode control signal generator 2 and 4 lines, and a parallel input and output circuit (PIO) 22. The host connection part generates the control signal needed for the mode control signal generator 2, and lets the system control part 14 check operation status after reception of the command from the system control part (CPU).

In FIG. 1, FIG. 3, and FIG. 4, the mode control signal generator 2 generates a bypass mode signal, a display mode signal, an acquisition mode signal, and a video image size signal after the reception of the control signal from the host connection part 1. The bypass mode signal lets the input video signal directly go to the monitor without storing in the frame memory. The display mode signal lets the contents of the frame memory output through the monitor. The acquisition mode signal lets one frame of the input video signal be recorded in the frame memory. The state transition of these signals are shown in FIG. 4. The bypass mode state is controlled by the bypass mode signal and the reset signal. The acquisition mode is controlled by the acquisition start signal. The display mode state is controlled by the acquisition completion signal and the display mode signal. A circuit diagram constructing such a state transient is shown in FIG. 3. The circuit, comprising an AND gate 31 which receives the bypass signal and the reset signal, an AND gate 32 which receives the display signal and the acquisition signal, an AND gate 33 which receives the output of the AND gate 32 and the acquisition start signal, an AND gate 34 which receives the AND gate 31 and the acquisition start signal, an AND gate 35 which receives the output of the AND gate 31 and the output of the AND gate 32, D type flip-flops which receive outputs of the AND gates 31 and 32, acquisition start signal through each preset terminal Pr, and three outputs of the AND gates 33, 34, and 35 through each clear terminal clr, D type flip-flops which receive outputs of the D type flip-flops 36, 37, and 38 through each data terminal D, and odd/even field signal through each clock terminal CK, an AND gate 43 which receives odd/even signal through an inverter 42, and the vertical synchronization signal, and an AND gate 44 which receives the output of the AND gate 43 and the output of the D type flip-flop 41, generates the bypass mode signal, the display mode signal, the acquisition mode signal, and the acquisition completion signal.

Also the mode control signal generator generates the video image size signal. If the video image size signal is "positive" signal, it indicates the video image size of 100 scanning lines × 160 pixels. If the video image size signal is "negative" signal, it indicates the video image size of 100 scanning lines × 96 pixels.

In FIG. 1, the separation circuit 3 consists of an LH 1881 IC chip. It separates the composite video signal into the horizontal synchronization signal, the composite synchronization signal, the odd/even field signal, and the burst signal. Then, those signals are applied to each functional block. And it also generates 50% horizontal synchronization signal from the composite synchronization signal, and applies it to the PLL circuit 4.

In the preferred embodiment of the present invention, the PLL circuit uses a NE564 chip. It synchronizes to the 50% cycle horizontal synchronization signal, and applies clock signal to each functional block after system clock generation of output frequency of 384 times the horizontal synchronization signal.

In FIG. 1 and FIG. 5, the window signal generator 5 includes the vertical window signal generator and the horizontal window signal generator. The vertical window signal generator includes a line counter 51 which receives the horizontal synchronization signal, a PAL IC 52 connected to the line counter 51 with 10 lines, and a flip-flop 53 which receives the outputs from the 35th line and the 235th line through the clock terminal CK and the clear terminal clr. The horizontal window signal generator includes a pixel counter 54 which receives the pixel clock, a PAL IC 55 connected to the pixel counter 54 with 8 lines, and a flip-flop 56 which receives the outputs from the 13th pixel and the 173rd pixel among the PAL IC outputs through the clock terminal and the clear terminal clr. The preferred embodiment of the present invention uses 12L6 as PAL IC 52 and 55.

The vertical window signal generation timing signal is a signal which is "positive" for 200 scanning lines, from the 35th synchronization signal pulse to the 235th horizontal synchronization signal pulse, after the vertical synchronization signal goes "positive" from "negative" during one frame interval. Otherwise, the it is "negative" as shown in FIG. 5(C). The horizontal window generator counts the sampling frequency in the scanning line while the vertical window signal is "positive." There are two kinds of horizontal window generation. One generates "positive" signal between the 13th clock pulse and the 173rd clock pulse as shown in FIG. 5(D). The other generates "positive" signal between the 45th clock pulse and the 141st clock pulse. One of these is chosen as the horizontal window signal by the video image size signal from the mode control signal generator.

In FIG. 1 and FIG. 6, in case it is acquisition mode or display mode, the address generator 6, comprising a line address counter 61 and a pixel address counter 62, generates an address for access to the video image storage memory while the window signal is "positive."

The line address counter 61 generates line address after counting the horizontal synchronization signal while the vertical window signal is "positive." The pixel address counter 62 generates pixel address after counting the sampling frequency while the horizontal window signal is "positive."

The address buffer 7 applies the output of the address generator to the video image storage memory only when it is acquisition mode or display mode. It records only 100 scanning lines out of 200 scanning lines. For displaying 200 scanning lines using 100 scanning lines stored in the video image storage memory, it ignores the least significant bit of the line address, and stores the data in the video image storage memory after decreasing the line address of the data to the address, one bit less than that. As a result, the compression of the rate 2:1 and the expansion of the rate 1:2 are performed without any additional hardware.

The analog interface parts 8 and 10 process the video signal from the camera, Max. 1 V, 75 ohm, according to the operation condition of the A/D converter 9, and then applies the processed signal to the A/D converter 9. It also sends the output of the D/A converter 11 to the monitor for display.

In the preferred embodiment of the present invention, a KSV3100A chip is used as the A/D converter 9. It samples the input video signal at the rate of 192 times the line frequency on real-time. And the resolution is 8-bit. The video image data, digitalized by the A/D converter 9, is sent to the data buffer 13 and the multiplexer 12.

In the preferred embodiment of the present invention, a KSV3100A chip is also used as the D/A converter 11. It converts the 8-bit digital video image data signal from the multiplexer into analog video signal. It adds composite synchronization signal to the analog video signal at the same time.

The multiplexer 12 supplies the output of the A/D converter 9 in the bypass mode and the acquisition mode, and the output of the D/A converter in the display mode.

The data buffer 13 sends the output of the A/D converter 9 to the video image data storage memory 16 through the system bus 17 in the acquisition mode, and sends the output of the video image data storage memory 16 to the multiplexer 12 in the display mode.

The video image data storage memory 16, using RAM of 32 kilobytes and connected to the system bus, stores a freeze-frame, received or being transmitted, for display. It also used by the video input and output part and the system control part 14 in accordance with the control of the bus adjustment circuit 15.

The present invention, shown above, receives composite video signal from the camera, and outputs the received video signal to the monitor in the freeze-frame video phone which transmits the freeze-frame video signal over standard telephone line during voice communication.

Given that the present invention provides a video input and output equipment with improved performance which generates sampling frequency synchronized to the video signal, and stores video image data of 256 grey levels, 8-bits wide, per pixel in memory after real-time sampling and quantization, video image of high quality can be obtained for both freeze-frame and dynamic frame. It is easy to change the video image size for a PAL is used to generate window signal, which is necessary to choose a specific part of the entire video image for communication. The compression of the rate 2:1 and the expansion of the rate 1:2 are performed without any additional hardware because two-dimensional addressing technique is used for the frame memory access. In addition, it is easy to maintain given that the present invention can be controlled by the push buttons or the system control part, and the operation status can be checked by the system control part.

What is claimed is:

1. A video input and output device for a freeze-frame video phone, which inputs video data for transmission from a camera and outputs video data to a monitor, comprising;

a bus;

a host connection means connected to the bus so as to allow checking of control and operation status of the equipment by a CPU, a mode control signal generation means connected to the host connection means, which receives control signal from the host connection means and generates a bypass mode signal, a display mode signal, an acquisition mode signal, and a video image size signal for controlling each operation;

a synchronization signal separation circuit which separates an input composite video signal into a vertical synchronization signal, a horizontal synchronization signal, a composite synchronization signal, an odd/even field signal, and a burst signal;

a PLL (Phase-Locked Loop) circuit which generates a signal with frequency of 384 times the horizontal synchronization signal from the synchronization signal separation circuit;

a window signal generation means connected to the PLL circuit, which selects a part of video image size out of an input video signal;

address buffer means connected to the bus, the window signal generation means, and the mode control signal generation means, which generates address for access of a video image data storage memory;

a first analog interface means for reception of the input video signal;

an A/D (Analog to Digital) converter connected to the first analog interface means;

a data buffer means connected to the bus and the A/D converter and the mode control signal generator, which transmits and receives data to and from the video image data storage memory;

a multiplexer connected to the data buffer means, the A/D converter, and the mode control signal generator;

a D/A converter which converts a digital signal from the multiplexer into an analog signal; and a second analog interface means connected to the D/A converter.

2. A video input and output device according claim 1, wherein the window signal generation means comprises a vertical window generator and a horizontal window generator, each of which generators respectively comprises a counter, a programmable array logic circuit connected to the counter, and a flip-flop circuit connected to the programmable array logic circuit.

3. A video input and output device according to claim 1, wherein the address buffer means includes an address generator which comprises a line address generator and a pixel address generator.

* * * * *

UNITED STATES PATENT AND TRADEMARK OFFICE
CERTIFICATE OF CORRECTION

PATENT NO. : 5,117,286
DATED : May 26, 1992
INVENTOR(S) : Jeong

It is certified that error appears in the above-indentified patent and that said Letters Patent is hereby corrected as shown below:

On the title page, Item [54] line 1, after "SIGNAL" insert —INPUT—.

Signed and Sealed this

Twenty-third Day of November, 1993

Attest:

BRUCE LEHMAN

*Attesting Officer*  *Commissioner of Patents and Trademarks*